(12) United States Patent
Huguenin et al.

(10) Patent No.: US 6,352,678 B1
(45) Date of Patent: Mar. 5, 2002

(54) PROCESS FOR PREPARING A RARE EARTH BORATE BY REACTING TOGETHER AT LEAST ONE RARE EARTH SALT, BORIC ACID AND A BASE

(75) Inventors: Denis Huguenin; Pierre Macaudiere, both of Asnieres-sur-Seine; Rachid Mahiou, Clairmont-Ferrand, all of (FR)

(73) Assignee: Rhodia Chimie, Boulogne Billancourt Cedex (FR)

( * ) Notice: Subject to any disclaimer, the term of this patent is extended or adjusted under 35 U.S.C. 154(b) by 0 days.

(21) Appl. No.: 09/671,530

(22) Filed: Sep. 27, 2000

Related U.S. Application Data

(63) Continuation of application No. 09/254,130, filed as application No. PCT/FR97/01523 on Aug. 25, 1997, now abandoned.

(30) Foreign Application Priority Data

Sep. 3, 1996 (FR) .............................................. 96 10724

(51) Int. Cl.$^7$ ................................................ C01F 17/00
(52) U.S. Cl. ........................................................ 423/263
(58) Field of Search ......................................... 423/263

(56) References Cited

U.S. PATENT DOCUMENTS

| 4,990,480 A | * | 2/1991 | Luetkens, Jr. et al. ...... 502/204 |
| 5,043,308 A | * | 8/1991 | Luetkens, Jr. et al. ...... 502/204 |
| 5,132,043 A | * | 7/1992 | Deboer .............. 252/301.4 RR |

FOREIGN PATENT DOCUMENTS

| SU | 385498 | * | 2/1978 | ................. 423/279 |

* cited by examiner

*Primary Examiner*—Stevens Bos

(57) ABSTRACT

The present invention provides a process for preparing a rare earth borate by reacting together at least one rare earth salt, boric acid and a base. The process is characterized in that the reaction is carried out using an excess of acid with respect to the stoichiometry and under conditions such that the pH of the reaction medium at the end of the reaction is in the range of 6 to 8. The precipitate formed is then recovered and calcined. The phase purity of the borate obtained is good and it can be used as a luminophore.

11 Claims, No Drawings

PROCESS FOR PREPARING A RARE EARTH BORATE BY REACTING TOGETHER AT LEAST ONE RARE EARTH SALT, BORIC ACID AND A BASE

This application is a continuation application of Ser. No. 09/254,130, filed on May 10, 1999, now abandoned, which is a 371 of PCT/FR 97/01523 filed Aug. 25, 1997.

The present invention relates to a process for preparing a rare earth borate by reacting together at least one rare earth salt, boric acid and a base.

Major developments are currently being made in the luminescence and electronics fields. Examples of such developments are the perfection of plasma systems (screens and lamps) for new viewing and lighting techniques. One particular application is that of replacing current television screens with flat screens. Such novel applications require luminophore materials with constantly improving properties. Rare earth borates constitute materials of that type.

The borates must have good phase purity and good crystallinity to be able to be used in the applications mentioned above.

Processes for preparing such borates are known which involve solid state reaction of rare earth oxides and boric acid. Such processes have the disadvantage of leading to products which are not phase pure or which cannot be calcined at high temperatures. This latter point constitutes a problem as the luminous yield of luminophores depends on this temperature and is higher at higher temperatures.

One aim of the present invention is to develop a process which does not have these disadvantages.

To this end, the invention provides a process for preparing a rare earth borate by reacting together at least one rare earth salt, boric acid and a base, characterized in that the reaction is carried out using an excess of acid with respect to the stoichiometry and under conditions such that the pH of the reaction medium at the end of the reaction is in the range 6 to 8, recovering the precipitate formed then calcining it.

Other characteristics, details and advantages of the invention will become apparent from the following description and the non limiting examples which illustrate it.

The process of the invention concerns the preparation of rare earth borates. The term "rare earth" as used in the present description means elements from the group constituted by yttrium, scandium and elements from the periodic table with an atomic number in the range 57 to 71 inclusive.

The term "rare earth borate" means products with formula $LnBO_3$ (orthoborate). Ln represents the rare earth as defined above. It should be understood that the process of the present invention can also be used to prepare mixed rare earth borates with formula $LnBO_3$, Ln being constituted by a mixture of two or more rare earths. The process of the present invention can in particular be used to prepare a borate of yttrium, lanthanum or gadolinium.

The process can also be used to prepare doped rare earth borates with formula $Ln_{1-x}M_xBO_3$, where M represents a doping element. This doping element is intended to endow the borate with luminescence properties or to reinforce them and it can be selected from the group formed by antimony, bismuth, cerium, terbium, lanthanum, gadolinium, europium, thulium, erbium and praseodymium. Since rare earths appear in this group, it goes without saying that the rare earth used as the doping element will be different from the rare earth constituting the borate.

The process of the invention consists of reacting a rare earth salt, boric acid and a base. The rare earth salt can be an inorganic or organic salt. Water-soluble salts are preferably used. More particularly, the rare earth salt is the nitrate. When preparing mixed borates, of course, a salt of each of the rare earths concerned is used.

In particular, the base is ammonia.

When a doped borate is prepared, the reaction is carried out in the presence of a salt of that element. The foregoing with respect to rare earth salts is applicable in this instance. Normally, the conditions used are such that the amount of doping element is at most 50 mole % with respect to the rare earth borate, more particularly at most 20%.

The reaction is preferably carried out with heat, for example at a temperature in the range 40° C. to 90° C.

One characteristic of the process of the invention is the use of an excess of boric acid for the reaction between the rare earth salt and boric acid. The term "excess" means that the B/Ln atomic ratio is greater than 1. Generally, the ratio is limited to at most 50% (i.e., a B/Ln ratio of 1.5), more particularly to at most 30%. Higher ratios have the disadvantage of requiring the elimination of a large quantity of boric acid at the end of the reaction, which renders the process of less interest from an industrial viewpoint. Normally, an excess of 10% to 30% boric acid, more particularly 20% or about 20%, is used.

A further characteristic of the process of the invention is that the pH of the reaction medium at the end of the reaction is in the range 6 to 8. This pH value can depend on the nature of the rare earth in the borate which is to be prepared. Thus when the rare earth is lanthanum, the pH is preferably in the range 7.5 to 8. For gadolinium, the pH is preferably in the range 6.5 to 7. Finally, for yttrium, the pH is preferably 7 or about 7. The pH values given above are those which result in products with good phase purity as easily as possible.

In one particular implementation of the invention, the reaction is carried out by forming a mixture comprising at least one rare earth salt and boric acid. After any necessary homogenisation of the mixture formed, the base is added to the mixture to produce the desired pH. A precipitate then forms.

Once precipitation is complete, the reaction medium can be aged if necessary.

The precipitate is separated from the reaction medium using any suitable means.

The precipitate obtained can be washed and optionally dried, for example oven dried. The precipitate can be ground if necessary.

The precipitate is then calcined. Calcining is carried out at a temperature which is sufficient to obtain the borate in a crystalline form.

The precipitate can be calcined at a temperature in the range 1000° C. to 1500° C., to produce a borate with a good luminescence yield.

It may be of interest to carry out a first calcining step at a lower temperature, in particular of the order of 500° C., to eliminate impurities, for example ammonium nitrate type impurities, then to carry out a second calcining step at a temperature in the range given above.

A non limiting example will now be given.

EXAMPLE

This example concerns the preparation of an orthoborate with formula $Y_{0.9}Eu_{0.1}BO_3$. The following starting solutions were used:

| | |
|---|---|
| $H_3BO_4$ | 0.24 M |
| $Y(NO_3)_3$ | 0.18 M |
| $Eu(NO_3)_3$ | 0.02 M |

The solutions were mixed for 30 minutes, with stirring, at a temperature of 60° C.

A 20% ammonia solution was added dropwise to this mixture until the pH reached 7. The mixture was then allowed to age for 30 minutes. The precipitate was washed by centrifugation then oven dried for 24 hours.

The product was calcined for 2 hours at 500° C. then for 2 hours at 1100° C.

X ray diffraction showed that the product obtained was in the form of a single $YBO_3$ phase.

What is claimed is:

1. A process for the preparation of a phase-pure rare earth orthoborate of the formula:

$$LnBO_3$$

wherein Ln is a rare-earth, comprising the steps of:
1) reacting together at least one rare earth salt, boric acid and a base in a reaction medium consisting of at least one rare earth salt, boric acid, a base and water,
    with an excess of boric acid for the reaction between the rare earth and boric acid with respect to a stoechiometric amount of said boric acid necessary to carry out said reaction and,
    under conditions such that the pH of the reaction medium at the end of the reaction is in the range of 6 to 8, to form a precipitate;
2) recovering the precipitate formed; and
3) calcining the precipitate recovered in step 2) to obtain the phase-pure rare earth orthoborate.

2. A process according to claim 1, wherein the excess of boric acid is in the range of 10% to 30%.

3. A process according to claim 1, wherein in step 1) the reaction is carried out by first forming a mixture comprising at least one rare earth salt and boric acid and, then, adding the base to the mixture.

4. A process according to claim 1, wherein in step 1) the reaction is carried out in the presence of a salt of a doping element.

5. A process according to claim 4, wherein the doping element is selected from the group consisting of antimony, bismuth, cerium, terbium, lanthanum, gadolinium, europium, thulium, erbium, and praseodymium.

6. A process according to claim 1, wherein in step 3) the precipitate is calcined at a temperature in the range of 1000° C. to 1500° C.

7. A process according to claim 3, wherein the rare earth is lanthanum and the pH is in the range 7.5 to 8.

8. A process according to claim 3, wherein the rare earth is gadolinium and the pH is in the range 6.5 to 7.

9. A process according to claim 3, wherein the rare earth is yttrium and the pH is 7.

10. A process according to claim 1, wherein the base is ammonia.

11. A process according to claim 1 wherein the rare earth orthoborate is an orthoborate of the formula:

$$Ln_{1-x}M_xBO_3$$

wherein Ln is a rare-earth, M is a doping element selected from the group consisting of antimony, bismuth, cerium, terbium, lanthanum, gadolinium, europium, thulium, erbium, and praseodymium, and the amount of doping element is at most 50% with respect to the rare earth orthoborate.

* * * * *